United States Patent
Matsuda

(10) Patent No.: US 9,537,927 B2
(45) Date of Patent: Jan. 3, 2017

(54) COMMUNICATION DEVICE

(71) Applicant: Munehisa Matsuda, Nagoya (JP)

(72) Inventor: Munehisa Matsuda, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 245 days.

(21) Appl. No.: 14/069,644

(22) Filed: Nov. 1, 2013

(65) Prior Publication Data

US 2014/0129674 A1    May 8, 2014

(30) Foreign Application Priority Data

Nov. 2, 2012  (JP) ................................ 2012-242302

(51) Int. Cl.
*G06F 15/16*    (2006.01)
*H04L 29/08*    (2006.01)
*G06F 3/12*     (2006.01)

(52) U.S. Cl.
CPC ............. *H04L 67/02* (2013.01); *H04L 67/12* (2013.01); *H04L 67/143* (2013.01); *H04L 69/321* (2013.01); *G06F 3/1211* (2013.01); *G06F 3/1236* (2013.01); *G06F 3/1284* (2013.01)

(58) Field of Classification Search
CPC ........ H04L 67/02; H04L 69/321; H04L 67/12; H04L 67/143; G06F 3/1211; G06F 3/1236; G06F 3/1284
See application file for complete search history.

(56) References Cited

U.S. PATENT DOCUMENTS

| | | | | |
|---|---|---|---|---|
| 7,197,565 | B2 * | 3/2007 | Abdelaziz | G06F 9/4416 709/224 |
| 7,594,040 | B2 * | 9/2009 | Oshima | H04L 12/281 370/351 |
| 7,890,612 | B2 * | 2/2011 | Todd | G06F 21/577 709/220 |
| 7,970,813 | B2 * | 6/2011 | Lum | G06F 21/41 709/201 |

(Continued)

FOREIGN PATENT DOCUMENTS

JP     2011-257945 A    12/2011

*Primary Examiner* — Moustafa M Meky
*Assistant Examiner* — Andrea Hurst
(74) *Attorney, Agent, or Firm* — Banner & Witcoff, Ltd.

(57) ABSTRACT

A communication device may communicate with a data processing device via a communication line. The data processing device may include client applications configured to execute communications by using multisession communication. The communication device may establish a session with a specific client application among the client applications via the communication line, and receive an HTTP request from the specific client application. The communication device may transmit an HTTP response to the specific client application via the established session. The transmission may include transmitting first disconnection instruction information to the data processing device in a case where the communication line used to receive the HTTP request is a line that is not capable of the multisession communication. The first disconnection instruction information may be information for causing the data processing device to disconnect the established session after transmitting the HTTP response.

16 Claims, 9 Drawing Sheets

(56) References Cited

U.S. PATENT DOCUMENTS

| | | | | |
|---|---|---|---|---|
| 8,037,202 B2* | 10/2011 | Yeager | G06F 9/4862 | 709/203 |
| 8,736,860 B2* | 5/2014 | Meike | G06F 3/1219 | 358/1.13 |
| 9,084,105 B2* | 7/2015 | Luna | H04W 8/24 | |
| 2003/0030843 A1* | 2/2003 | Qiao | H04L 63/02 | 358/1.15 |
| 2003/0041141 A1* | 2/2003 | Abdelaziz | G06F 9/4416 | 709/223 |
| 2003/0078965 A1* | 4/2003 | Cocotis | H04L 29/06 | 709/203 |
| 2003/0236907 A1* | 12/2003 | Stewart | H04L 29/06 | 709/231 |
| 2004/0133640 A1* | 7/2004 | Yeager | G06F 9/4862 | 709/204 |
| 2005/0108710 A1* | 5/2005 | Patiejunas | H04L 29/06 | 718/100 |
| 2006/0117084 A1* | 6/2006 | Morozumi | H04N 1/00204 | 709/203 |
| 2006/0136596 A1* | 6/2006 | Izumi | H04L 12/5692 | 709/230 |
| 2006/0150236 A1* | 7/2006 | Sakuda | H04L 12/281 | 725/135 |
| 2006/0171401 A1* | 8/2006 | Charles | H04L 12/4641 | 370/401 |
| 2006/0190238 A1* | 8/2006 | Autor | G06F 13/105 | 703/25 |
| 2007/0053376 A1* | 3/2007 | Oshima | H04N 5/765 | 370/462 |
| 2007/0261112 A1* | 11/2007 | Todd | G06F 21/577 | 726/11 |
| 2008/0178278 A1* | 7/2008 | Grinstein | H04L 63/0227 | 726/12 |
| 2009/0237728 A1* | 9/2009 | Yamamoto | G06F 3/1454 | 358/1.15 |
| 2011/0302512 A1 | 12/2011 | Ishii | | |
| 2012/0072548 A1* | 3/2012 | Kim | H04L 61/1535 | 709/219 |
| 2012/0271908 A1* | 10/2012 | Luna | G06F 9/5016 | 709/216 |
| 2013/0212487 A1* | 8/2013 | Cote | G06F 3/048 | 715/745 |
| 2013/0263280 A1* | 10/2013 | Cote | G06F 21/62 | 726/26 |

* cited by examiner

FIG. 5

| 111 | GET / HTTP/1.1 |
| 112 | Accept: image/gif, image/jpeg, */*<br>Accept-Language: ja<br>Accept-Encoding: gzip, deflate<br>User-Agent: Mozilla/4.0 (Compatible; MSIE 6.0; Windows NT 5.1;) |
| R0 | Host: www.xxx.zzz |
| R1 | Connection: Keep-Alive |
| 113 | ....... |

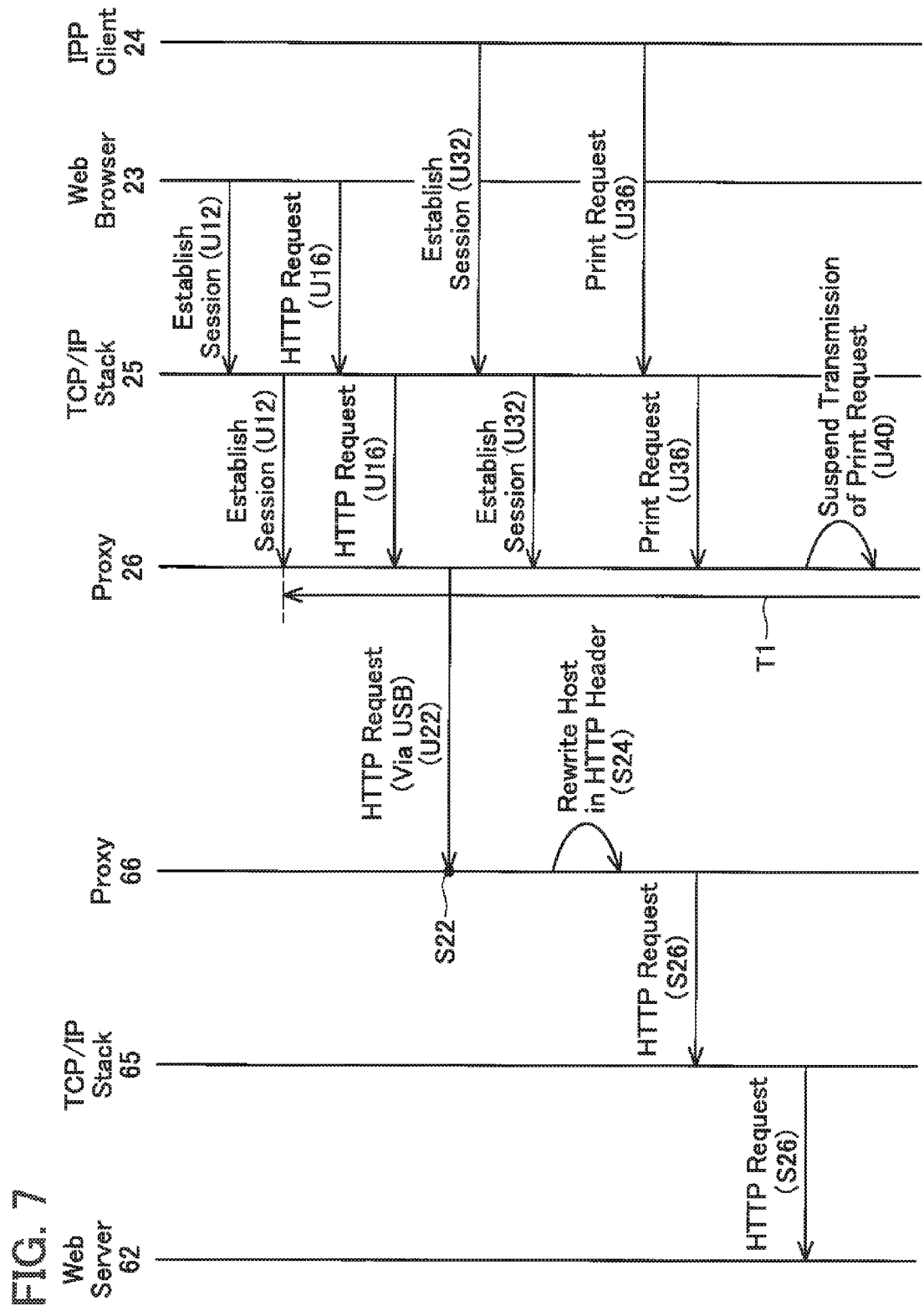

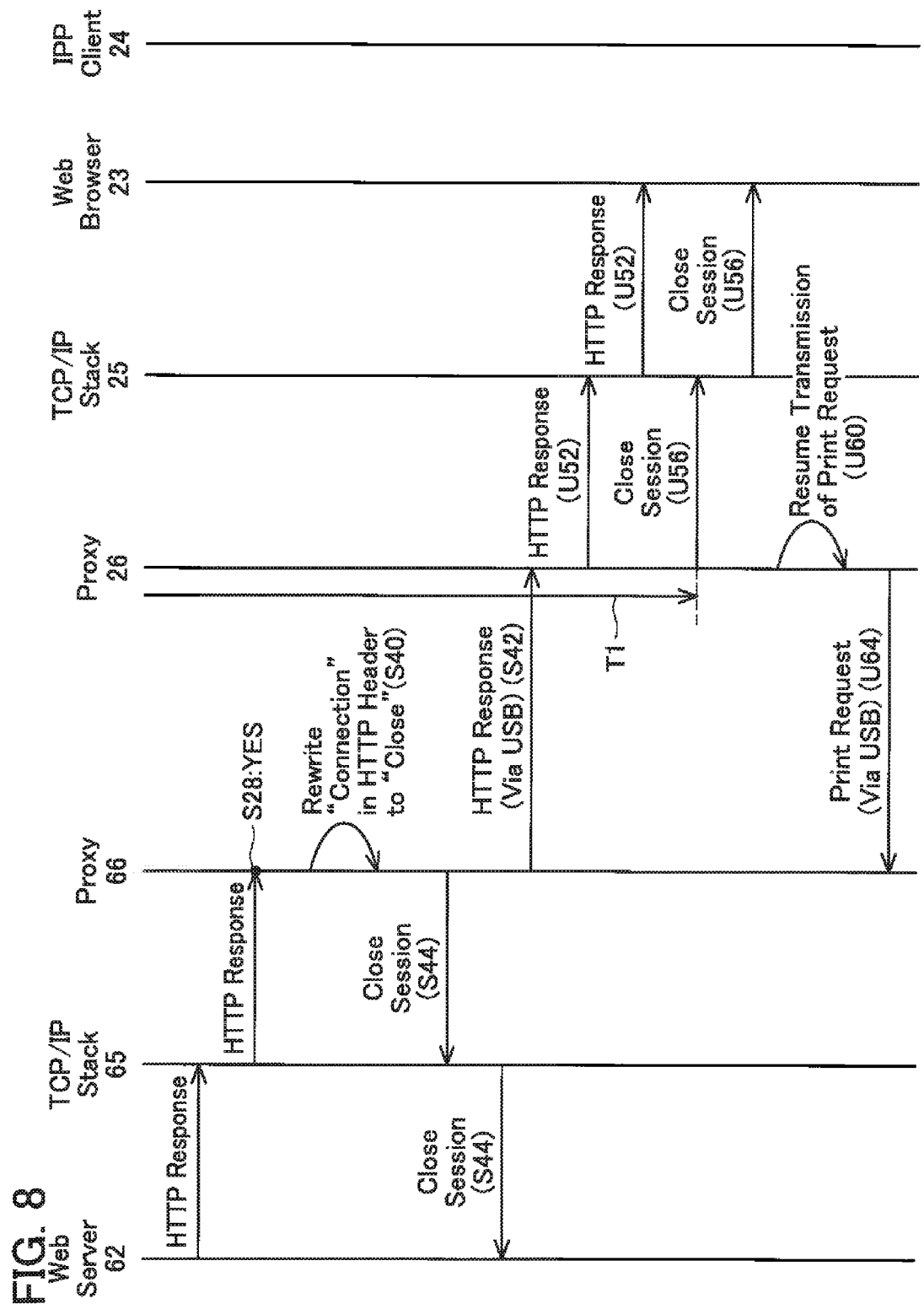

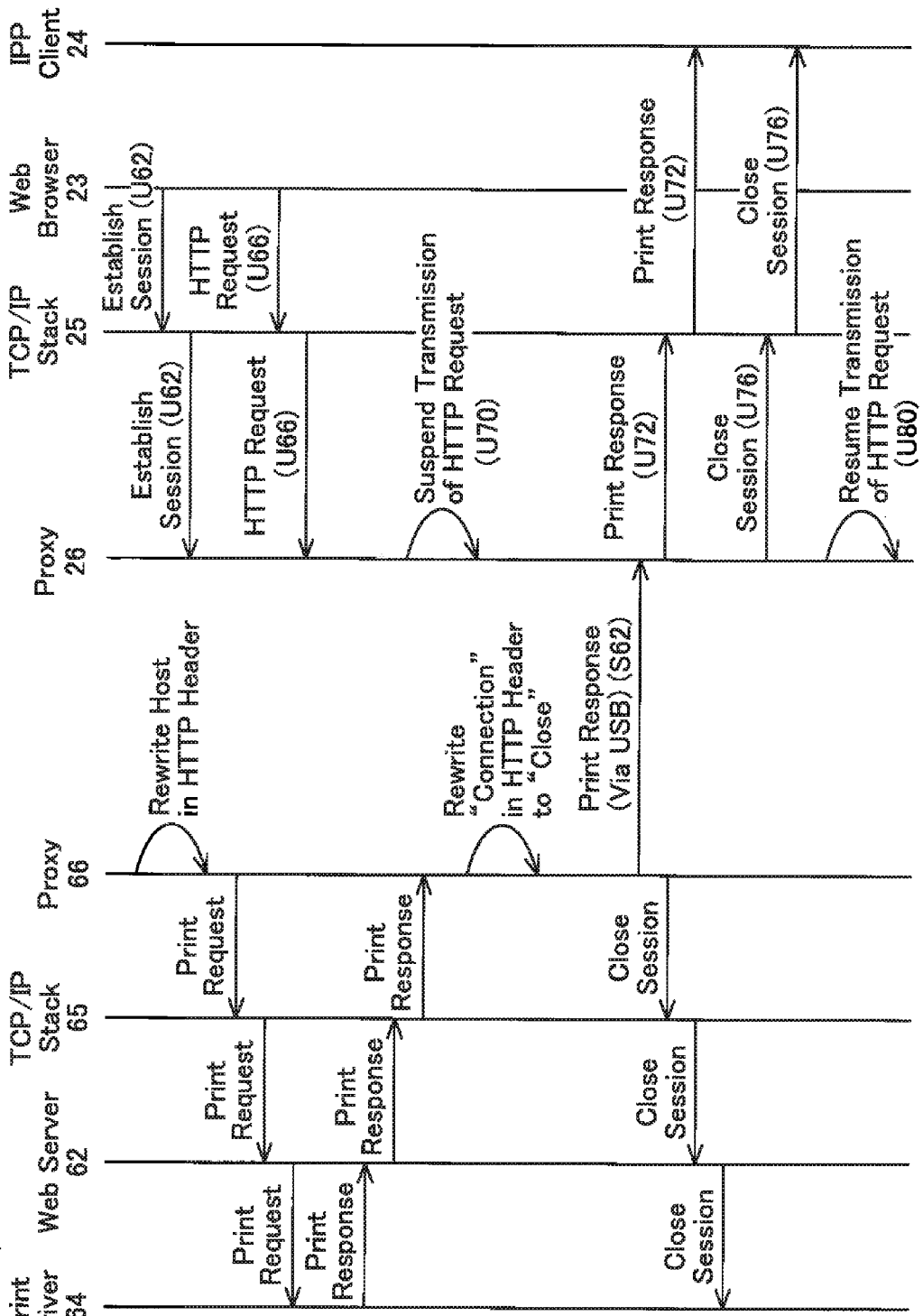

COMMUNICATION DEVICE

CROSS-REFERENCE TO RELATED APPLICATION

This application claims priority to Japanese Patent Application No. 2012-242302, filed on Nov. 2, 2012, the contents of which are hereby incorporated by reference into the present application.

TECHNICAL FIELD

The techniques disclosed in the present specification relate to communication devices that are capable of communicating various pieces of data.

DESCRIPTION OF RELATED ART

To date, a technique is known in which an image processing device is equipped with a web server function, and a configuration setting screen or the like for the image processing device is displayed in a web browser that is executed in a terminal device. In addition, a standard called Internet Printing Protocol (IPP) is known, in which the image processing device and the terminal device are interconnected through a network and the image processing device is caused to process an image through the network. Furthermore, known is a draft of another standard called IPP over Universal Serial Bus (USB) for carrying out communication according to the aforementioned IPP in an environment in which the image processing device and the terminal device are interconnected through the USB.

The USB can include a plurality of logical channels called endpoints. As the USB includes the plurality of endpoints, a plurality of communication paths can be formed using the USB, which is physically for serial communication.

SUMMARY

There are cases where a plurality of types of requests needs to be communicated in the same period of time using one endpoint. The request to display the configuration setting screen for the image processing device in the web browser and the request to execute printing by the image processing device is an example of the plurality of types of requests. However, a concept of multisession is not present in the USB. Thus, while a session is established to the web server function through one of the requests, the other of the requests cannot establish another session to the web server function. In this case, the other request cannot start communication until the session that is established through the one request is disconnected by a time-out or the like, and thus convenience for a user may be lost. In the present specification, a technique that is capable of resolving such inconvenience is provided.

In one aspect of the teachings disclosed herein, a communication device configured to communicate with a data processing device via a communication line may be provided. The data processing device may include one or more client applications configured to execute communications by using multisession communication. The communication device may comprise a control device. The control device may be configured to establish a session with a specific client application among the one or more client applications via the communication line. The control device may be configured to receive an HTTP request from the specific client application via the established session. The control device may be configured to transmit an HTTP response to the specific client application via the established session. The HTTP response may be a response to the HTTP request received in the reception. The transmission may include transmitting first disconnection instruction information to the data processing device in a case where the communication line used to receive the HTTP request is a line that is not capable of the multisession communication. The first disconnection instruction information may be information for causing the data processing device to disconnect the established session after transmitting the HTTP response to the specific client application via the established session.

BRIEF DESCRIPTION OF DRAWINGS

FIG. 5 illustrates an example of an HTTP request;

FIG. 7 is a sequence diagram illustrating an operation example of the communication system;

FIG. 8 is a sequence diagram illustrating an operation example of the communication system; and FIG. 9 is a sequence diagram illustrating an operation example of the communication system.

EMBODIMENT

<Configuration of Communication System>

Figure 1:
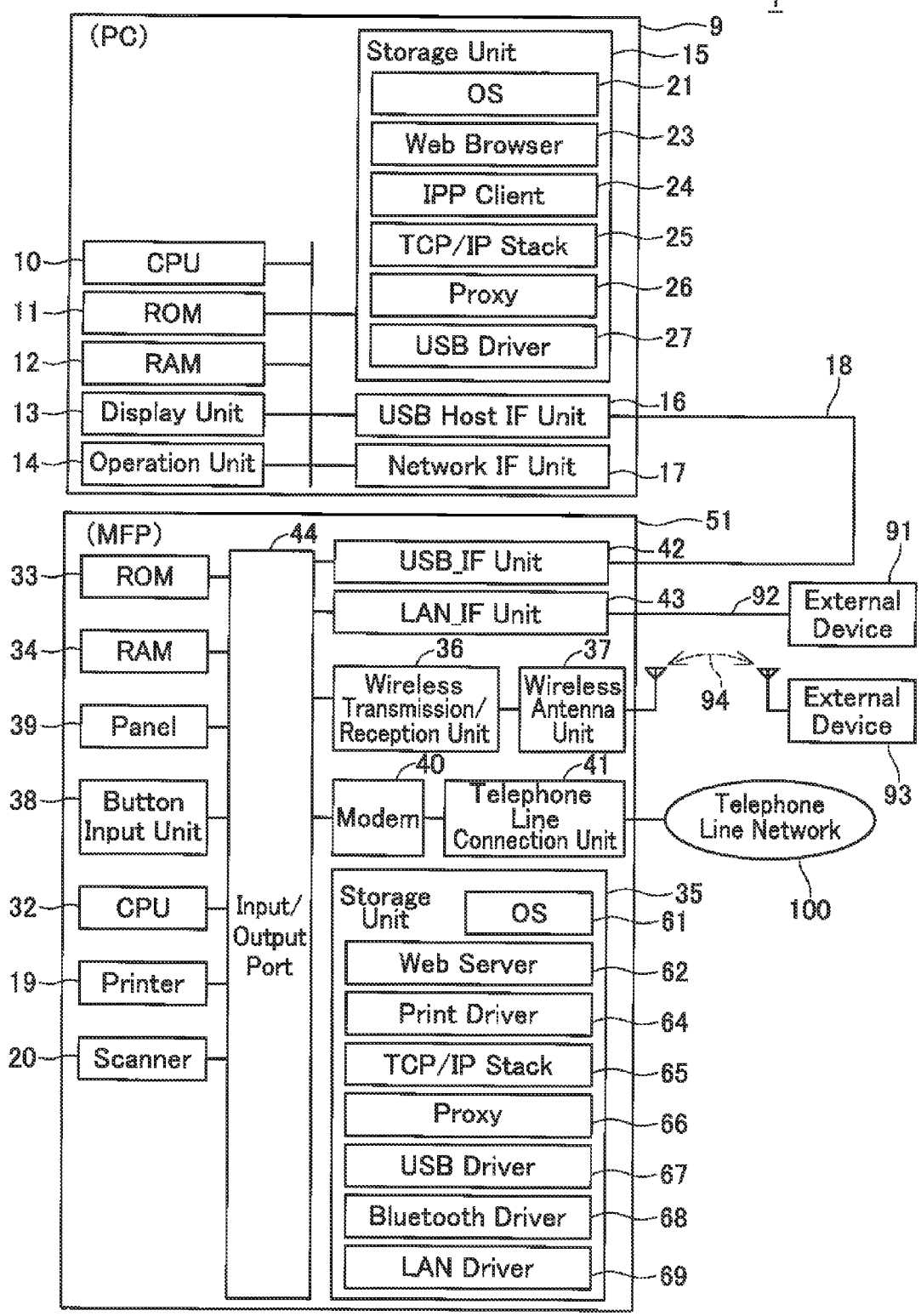
FIG. 1 is a diagram illustrating an electrical configuration of a communication system 1.

FIG. 1 illustrates an electrical configuration of a communication system 1, which is illustrated as a first embodiment of the present application. The communication system 1 includes a personal computer (referred to as PC) 9, a multifunction peripheral (hereinafter, referred to as "MFP") 51, and external devices 91 and 93. The MFP 51 includes a printer function, a scanner function, a copy function, a facsimile function, and so on. PCs and cellphones are examples of the external devices 91 and 93.

The configuration of the PC 9 will be described. The PC 9 includes a CPU 10, a ROM 11, a RAM 12, a display unit 13, an operation unit 14, a storage unit 15, a USB host interface unit (referred to as USB host IF unit in FIG. 1) 16, and a network interface unit (referred to as network IF unit in FIG. 1) 17.

The CPU 10 executes programs that are stored in the ROM 11 and the storage unit 15 to control each unit of the PC 9. The programs to be executed by the CPU 10, data, and so on are stored in the ROM 11. The RAM 12 is used as a main storage device for the CPU 10 to execute various processes.

The display unit 13 includes a display device such as a liquid crystal display, a display drive circuit for driving the display device, and so on. The operation unit 14 includes a keyboard, a mouse, an interface to which the keyboard and the mouse are connected, and so on. The storage unit 15 is a device for storing various programs and data using a non-volatile memory such as a hard disk and a flash memory. Programs such as an operating system (referred to as OS) 21, a web browser 23, an IPP client 24, a TCP/IP stack 25, a proxy 26, and a USB driver 27 are stored in the storage unit 15. Contents of these programs will be described later.

The USB host interface unit 16 includes a Universal Serial Bus (USB) host controller (not illustrated), a jack (not illustrated) to which a USB cable is connected, and so on. The USB host interface unit 16 is a portion that communicates with the MFP 51 through a USB 18. The USB 18 is a communication line that is not capable of multisession communication. The network interface unit 17 is an interface for communicating with a communication terminal (not illustrated) such as a PC, a cellphone, and a portable communication terminal through a communication network such as a Local Area Network (LAN) and the Internet.

The configuration of the MFP 51 will be described. The MFP 51 includes, primarily, a printer 19, a scanner 20, a CPU 32, a ROM 33, a RAM 34, a storage unit 35, a wireless transmission/reception unit 36, a wireless antenna unit 37, a button input unit 38, a panel 39, a modem 40, a telephone line connection unit 41, a USB interface unit (referred to as USB_IF unit in FIG. 1) 42, and a LAN interface unit (referred to as LAN_IF unit in FIG. 1) 43. These constituent elements are communicable with one another through an input/output port 44. The ROM 33 stores various programs. The CPU 32 executes the programs stored in the ROM 33. The RAM 34 is a volatile memory.

The storage unit 35 is a device for storing various programs and data using a non-volatile memory such as a hard disk and a flash memory. The programs such as an OS 61, a web server 62, a print driver 64, a TCP/IP stack 65, a proxy 66, a USB driver 67, a Bluetooth driver 68, and a LAN driver 69 are stored in the storage unit 35. Content of these programs will be described later.

The USB interface unit 42 is a portion that communicates with the PC 9 through the USB 18. The LAN interface unit 43 is a portion that communicates with the external device 91 through LAN communication 92. The wireless transmission/reception unit 36 is a portion that carries out Bluetooth communication 94 with the external device 93 through the wireless antenna unit 37. The LAN communication 92 and the Bluetooth communication 94 are communication lines that are capable of multisession communication. The button input unit 38 is a key for executing each function in the MFP 51. The button input unit 38 may be configured integrally with the panel 39 in the form of a touch panel. The panel 39 displays various images. The printer 19 is a portion that executes printing on printing paper. The scanner 20 is a portion that scans a paper document to generate image data. The modem 40 modulates document data, which is to be transmitted through the facsimile function, into a signal that can be transmitted to a telephone line network 100 and then transmits the signal through the telephone line connection unit 41, or receives a signal that is inputted from the telephone line network 100 through the telephone line connection unit 41 and then demodulates the signal into the document data.

<Communication Between PC and MFP>

The PC 9 carries out at least the following communication with the MFP 51 through the USB 18. (1) Communication for configuring settings for the MFP 51. (2) Communication for transmitting print data to the MFP 51. These two instances of communication are carried out in compliance with the IPP over USB standard. The Internet Printing Protocol (IPP) is a standard that is based on HyperText Transfer Protocol (HTTP) and is the standard for communicating with the MFP 51 through a TCP/IP network such as the Internet and LAN. The PP over USB is a standard for realizing communication through the above-described IPP in an environment in which a connection is established through the USB. In the IPP over USB, IPP communication data is transmitted or received while being stored in USB packets.

<Program Configuration of PC and MFP>

Figure 2:
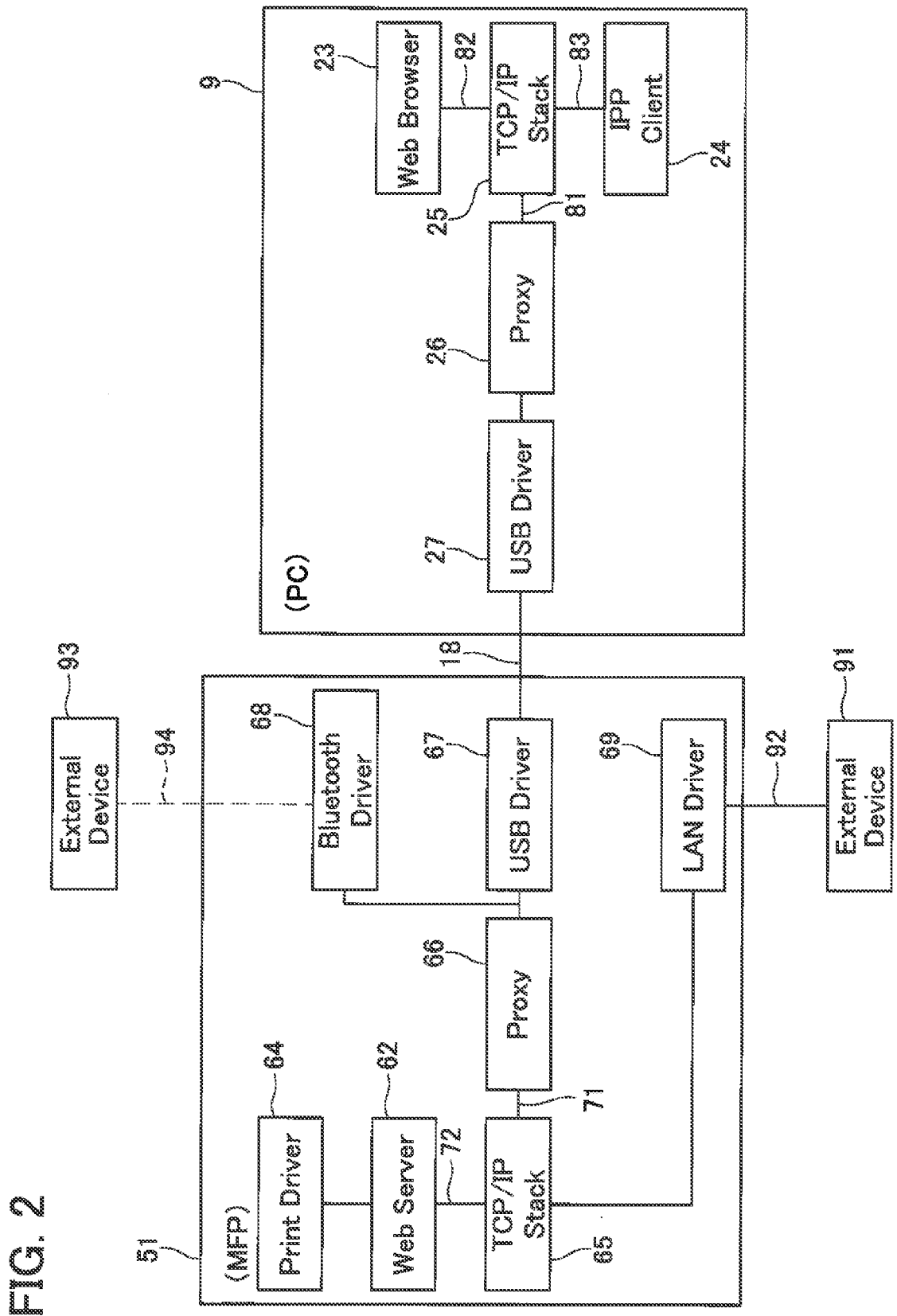
FIG. 2 is a diagram illustrating a program configuration of a PC and an MFP.

With reference to FIG. 2, the program configuration of the PC 9 and the MFP 51 for carrying out communication through the IPP over USB will be described. The PC 9 executes programs such as the web browser 23, the IPP client 24, the TCP/IP stack 25, the proxy 26, and the USB driver 27.

The web browser 23 is a program used as a user interface for the user to configure various settings for the MFP 51. A generally used web browser can be used as the web browser 23. The web browser 23 is a client application that carries out multisession communication.

The TCP/IP stack 25 is a group of programs obtained by bundling programs that relate to the TCP/IP communication protocol into one. A socket 81 is created between the TCP/IP stack 25 and the proxy 26. A socket 82 is created between the TCP/IP stack 25 and the web browser 23. A socket 83 is created between the TCP/IP stack 25 and the IPP client 24. The socket is an abstract interface for carrying out communication through TCP/IP and is a mechanism for connecting an application to the network. Specifically, the socket includes a network address in which an IP address, which corresponds to an address within the network, of a computer that carries out communication through TCP/IP and a port number, which is a sub (auxiliary) address of the IP address, are combined. The application can transmit and receive data without paying attention to the details of a communication procedure only by specifying the socket, which is a pair of the address and the port, to establish a communication.

The proxy 26 is a program that relays a connection through HTTP for WWW browsing. The proxy 26 is connected to the USB 18 through the USB driver 27. The USB driver 27 is a program for controlling the USB host interface unit 16 to execute communication through the USB 18. The proxy 26 relays communication between the web browser 23 and the proxy 66 and between the IPP client 24 and the proxy 66. The proxy 26 works as a server for a particular port of localhost (IP=127.0.0.1) (in the description below, a port 80 is used). The web browser 23 accesses the port 80 of localhost (example: http://127.0.0.1:80) to thus request the proxy 26 to transmit screen data. The data for displaying the configuration setting screen for configuring various settings for the MFP 51 is an example of the screen data. Here, the screen data is written in HyperText Markup Language (HTML) or in Extensible Markup Language (XML). The request that has been transmitted to the proxy 26 is transmitted to the proxy 66 of the MFP 51 through the USB 18 by the proxy 26.

The IPP client 24 is a program that carries out communication through the IPP to receive a service from the web server 62. The IPP client 24 is a client application that carries out multisession communication. A spooler is an example of the IPP client 24. The spooler is a program that temporarily stores the print data. The IPP client 24 may be provided as part of the OS 21. If the IPP client 24 is the spooler, the IPP client 24 communicates with the proxy 26 through the IPP to transmit the print data to the proxy 26 in an environment in which the PC 9 and the MFP 51 are interconnected through the USB 18. The print data that has been transmitted to the proxy 26 is transmitted to the proxy 66 of the MFP 51 through the USB 18 by the proxy 26.

With reference to FIG. 2, the program configuration of the MFP 51 will be described. The MFP 51 executes programs such as the web server 62, the print driver 64, the TCP/IP stack 65, the proxy 66, the USB driver 67, the Bluetooth driver 68, and the LAN driver 69. A socket 71 is created between the TCP/IP stack 65 and the proxy 66. A socket 72 is created between the TCP/IP stack 65 and the web server 62.

The web server 62 is a program that has an information transmission function through HTTP. The web server 62 plays a role of accumulating information such as HTML documents and images in advance and transmitting these pieces of information through the network such as the Internet in response to the request from the client application such as the web browser. In addition, the web server 62 has a function of outputting the print data that has been received from the PC 9 to the print driver 64. The print driver 64 is a program for controlling the printer 19 to execute printing.

The proxy 66 is a program that relays a connection through the HTTP for WWW browsing. The proxy 66 is connected to the USB 18 through the USB driver 67. The USB driver 67 is a program for controlling the USB interface unit 42 to execute communication through the USB 18. The proxy 66 communicates with the external device 93 through the Bluetooth driver 68 and the Bluetooth communication 94. The Bluetooth driver 68 is a program for controlling the wireless transmission/reception unit 36 and the wireless antenna unit 37 to execute the Bluetooth communication 94. The TCP/IP stack 65 communicates with the external device 91 through the LAN driver 69 and the LAN communication 92. The LAN driver 69 is a program for controlling the LAN interface unit 43 to execute the LAN communication 92.

<Interface in USB>

Subsequently, the interface in the USB 18 will be described. In the USB 18, one or more logical communication lines called interfaces are constituted in physically a single USB cable. In the USB 18, a special endpoint called an endpoint 0 is always constituted for a control transfer. The endpoint 0 is an endpoint that is capable of two-way communication. The interface is constituted based on an interface descriptor that is obtained from the MFP 51 through the endpoint 0. Each interface typically includes one or a plurality of endpoints.

An interface 1 is constituted in the MFP 51 of the present embodiment. Furthermore, the interface 1 includes a reading endpoint and a writing endpoint and realizes two-way communication using these endpoints. In addition, the communication for configuring settings for the MFP 51 and the communication for transmitting the print data to the MFP 51 are carried out by using the interface 1. In other words, in the present embodiment, a case where the proxy 66 receives the HTTP request from each of the web browser 23 and the IPP client 24 through one reading endpoint will be described.

<Details of Communication Relay Processing by Proxy>

Figure 3:
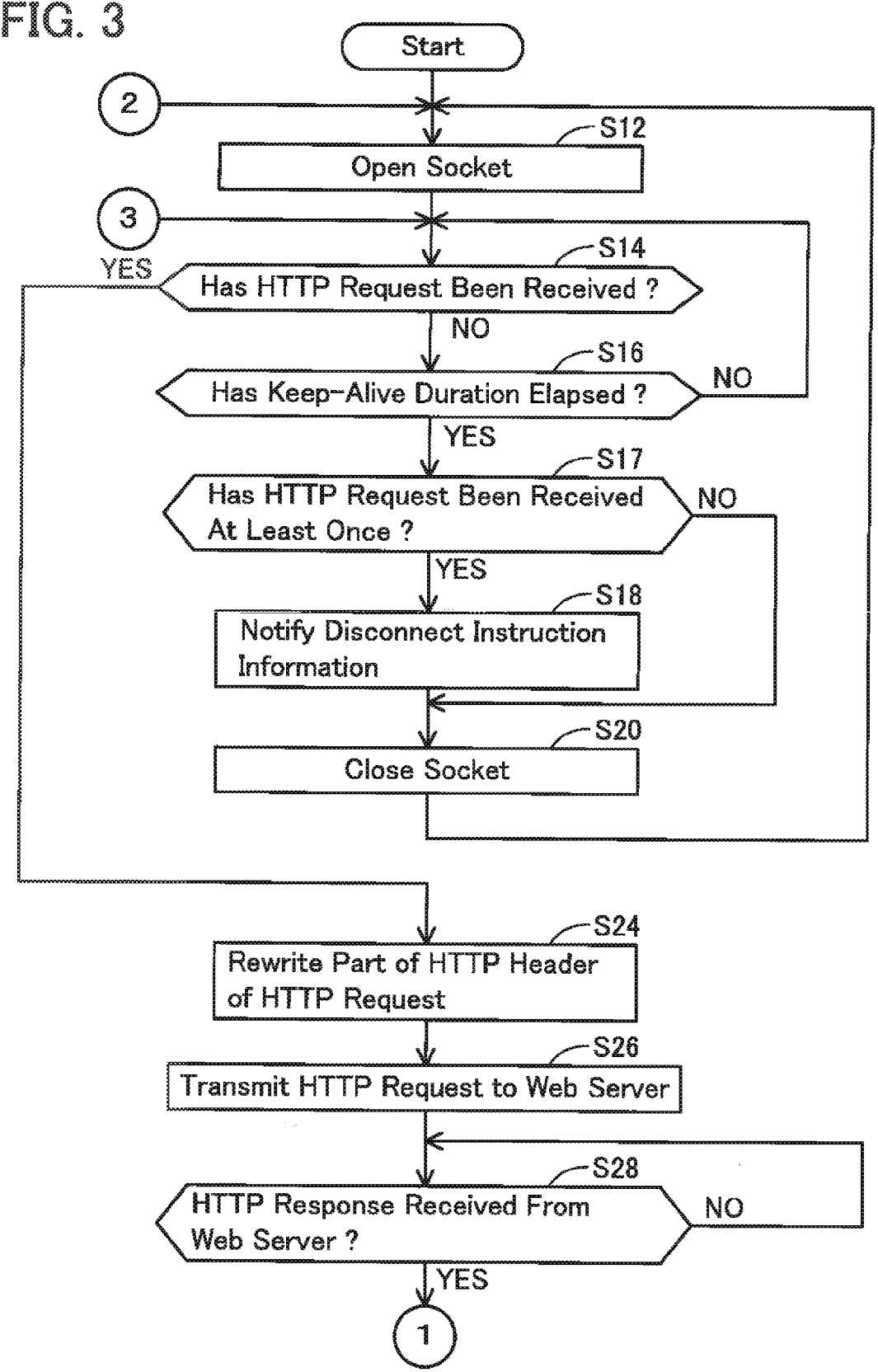
FIG. 3 is a flowchart of communication relay processing carried out by a proxy of the MFP.
Figure 4:
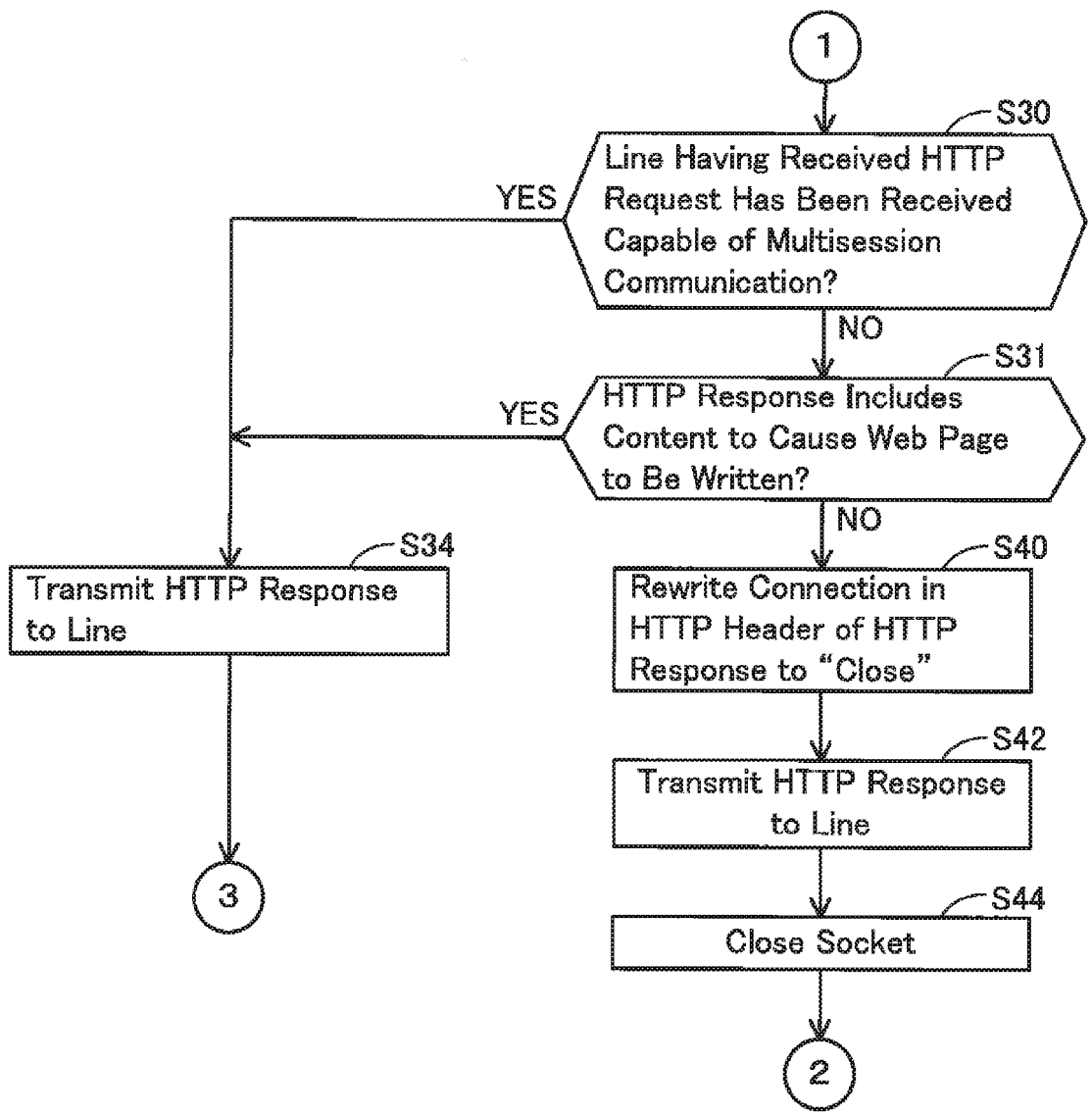
FIG. 4 is a flowchart of communication relay processing carried out by a proxy of the MFP.

With reference to FIGS. 3 and 4, communication relay processing that is carried out by the proxy 66 of the MFP 51 will be described. The proxy 66 is executed as a resident program, and this communication relay processing is started as the resident program upon the MFP 51 being powered on. In the description to follow, the term proxy 66 may refer to the CPU 32 that executes the proxy 66.

In S12, the proxy 66 opens the sockets 71 and 72. Thus, the communication path is formed between the proxy 66 and the web server 62.

In S14, the proxy 66 determines whether or not the proxy 66 has received an HTTP request from any one of the PC 9 and the external devices 91 and 93. If the HTTP request has not been received (S14: NO), the proxy 66 proceeds to S16.

In S16, the proxy 66 determines whether or not Keep-Alive duration has elapsed. Keep-Alive is a system for retaining the connection established to the web server 62 even after a transfer ends and for using the retained connection in the second and subsequent requests. The use of Keep-Alive makes it unnecessary to establish the connection on a file-by-file basis, and thus a CPU load and a communication time can be saved. The specifications for Keep-Alive are defined by RFC 2616 (HTTP 1.1). The Keep-Alive duration is a waiting time from when the request from the connected session ceases to come in until the session is disconnected. The duration may be preset by the user or the like. A time set in Keep Alive Timeout is an example of such duration. If the duration has not elapsed (S16: NO), the proxy 66 returns to S14, and if the duration has elapsed (S16: YES), the proxy 66 proceeds to S17.

In S17, the proxy 66 determines whether or not the proxy 66 has received the HTTP request at least once in S14 after the socket is opened in S12. If the HTTP request has never been received (S17: NO), the proxy 66 skips S18 and proceeds to S20, if the HTTP request has been received (S17: YES), the proxy 66 proceeds to S18. Thus, disconnect instruction information can be controlled not to be notified (S18) to the PC 9 if the HTTP request has never been received as in a case where the MFP 51 is simply powered on.

In S18, the proxy 66 notifies the PC 9, through the USB 18, of the disconnect instruction information that causes the PC 9 to execute processing for disconnecting the session. The disconnect instruction information is information that causes the PC 9 to close the connection. In addition, the disconnect instruction information is data that corresponds to "FIN" in the TCP. In S20, the proxy 66 closes the sockets 71 and 72. Thus, the communication path between the proxy 66 and the web server 62 is eliminated.

Meanwhile, in S14, if the HTTP request has been received (S14: YES), the proxy 66 proceeds to S24. FIG. 5 illustrates an example of the HTTP request. As illustrated in FIG. 5, an HTTP request message includes a request line 111, a header 112, and a message body 113. The request line 111 is a line for informing the web server 62 which processing is to be executed. The request line 111 includes three pieces of information, namely, "method", "URL", and "HTTP version". The header 112 is information that is sent prior to the message body 113 and that indicates various conditions. The header 112 includes information that indicates a connection state (Connection). The header 112 of the HTTP request illustrated in FIG. 5 includes information that indicates execution of Keep-Alive (see area R1). The message body 113 is a portion that includes data written in HTML, image data, and so on.

In S24, the proxy 66 rewrites Host (see area R0 in FIG. 5) to the web server 62 in the HTTP header of the HTTP request. In S26, the proxy 66 transmits the HTTP request to the web server 62. Thus, the HTTP request which the proxy 66 has received from the web browser 23 is transferred to the web server 62. In S28, the proxy 66 determines whether or not the proxy 66 has received an HTTP response to the HTTP request from the web server 62. If the HTTP response has not been received (S28: NO), the proxy 66 returns to S28, and if the HTTP response has been received (S28: YES), the proxy 66 proceeds to S30.

Figure 6:
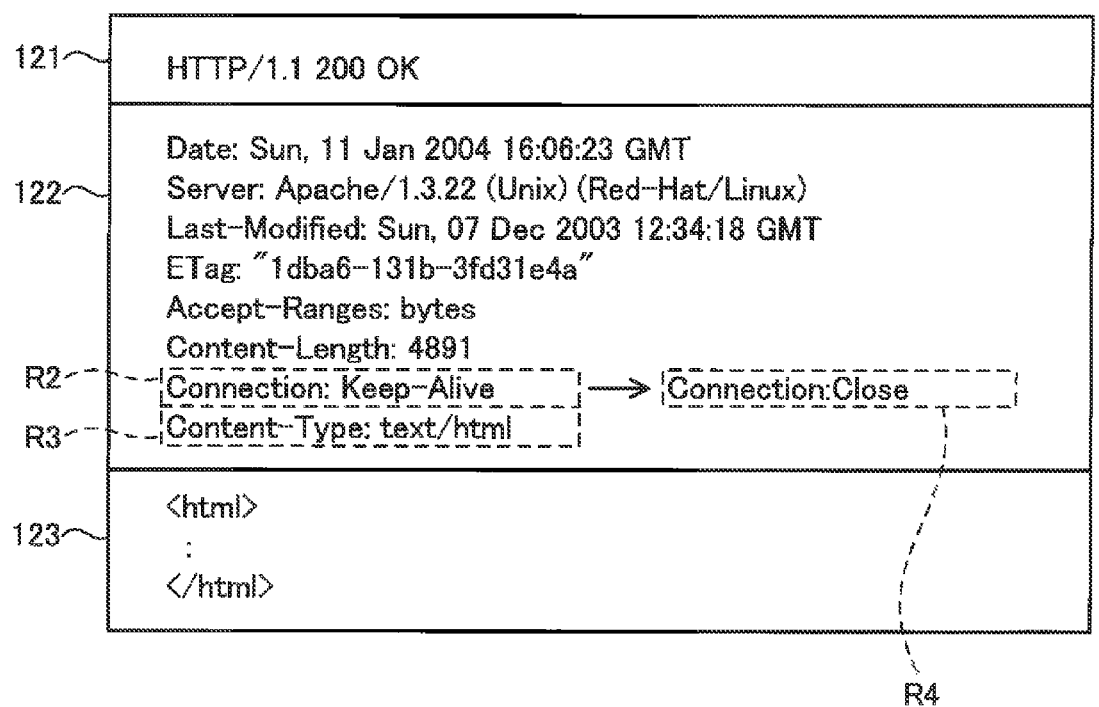
FIG. 6 illustrates an example of an HTTP response.

FIG. 6 illustrates an example of the HTTP response. As illustrated in FIG. 6, an HTTP response message includes a response line 121, a header 122, and a message body 123. The response line 121 is a line that indicates the condition of the response to the HTTP request. The header 122 is information that indicates various conditions. The message body 123 is a portion that includes data written in HTML, and so on. The header 122 of the HTTP response illustrated in FIG. 6 includes information that indicates a connection state (Connection) of "Keep-Alive" (see area R2 in FIG. 6).

In S30, the proxy 66 determines whether or not the line through which the HTTP request has been received is the line that is capable of multisession communication. Specifically, the proxy 66 determines whether or not the driver that has been used when receiving the HTTP request is the driver for the line that is capable of multisession communication. For example, in the program configuration illustrated in FIG. 2, the USB 18 is the line that is not capable of multisession communication, and the Bluetooth communication 94 is the line that is capable of multisession communication. Thus, if the proxy 66 has received the HTTP request through the USB driver 67, the proxy 66 can determine that the line through which the HTTP request has been received is not capable of multisession communication. Meanwhile, if the proxy 66 has received the HTTP request through the Bluetooth driver 68, the proxy 66 can determine that the line through which the HTTP request has been received is capable of multisession communication. If it is determined that the line through which the HTTP request has been received is the line that is not capable of multisession communication (S30: NO), the proxy 66 proceeds to S31. In S31, the proxy 66 determines whether or not the HTTP response is a response with content to cause a web page to be written. Specifically, the proxy 66 determines whether or not "Content-type" (see area R3 in FIG. 6) in the HTTP header of the HTTP response is "html". If the HTTP response is not content to cause the web page to be written (S31: NO), the proxy 66 proceeds to S40.

In S40, the proxy 66 rewrites the content of the message, that is specified in the HTTP header of the HTTP response and that relates to the connection, to the content to close the connection. Specifically, the proxy 66 rewrites "Connection" in the HTTP header of the HTTP response to "close" (see area R4 in FIG. 6). This process can cause the web browser 23 to execute the processing for terminating Keep-Alive. In S42, the proxy 66 transmits the HTTP response to the web browser 23 of the PC 9 through the USB 18. Thus, the HTTP response which the proxy 66 has received from the web server 62 is transferred to the web browser 23.

In S44, the proxy 66 closes the sockets 71 and 72. Specifically, the proxy 66 transmits the data that corresponds to "FIN" in the TCP to the TCP/IP stack 65 and the web server 62. Thus, the communication path between the proxy 66 and the web server 62 is eliminated. The flow then returns to S12.

Meanwhile, if the line through which the HTTP request has been received is capable of multisession communication (S30: YES), or if the HTTP response is a response with content to cause the web page to be written (S31: YES), the proxy 66 proceeds to S34. In S34, the proxy 66 transmits the HTTP response to the web browser 23 of the PC 9 through the USB 18. The proxy 66 then returns to S14. At this point, "Connection" in the HTTP header of the HTTP response is not rewritten. Thus, if the proxy 66 has received, from the web server 62, the HTTP response in which "Connection" in the HTTP header is "Keep-Alive", Keep-Alive is retained.

<Operation of Communication System 1>

With reference to sequence diagrams illustrated in FIGS. 7 to 9, an exemplary operation of the communication system 1 will be described. In this example, a case where the communication for configuring settings for the MFP 51 from the PC 9 and the communication for carrying out printing in the MFP 51 from the PC 9 are both executed using the interface 1 of the USB 18 will be described. In addition, in this example, a case where in the HTTP header of the HTTP response transmitted from the web server 62, "Connection" is "Keep-Alive" and "Content-type" is not "html" will be described. Furthermore, in this example, a case where the configuration setting screen displayed in the web browser 23 is a screen that requires a plurality of pieces of image data and a plurality of sessions needs to be established will be described.

The proxy 26 resides as a TCP server program for http://127.0.0.1:80. The web browser 23 establishes a network session to the proxy 26, upon the user inputting the address (http://127.0.0.1:80) for instructing display of the configuration setting screen (U12). The web browser 23 transmits, to the proxy 26 through the established session, the HTTP request that requests for the transmission of a main page of the configuration setting screen (U16). The proxy 26 transfers the received HTTP request to the proxy 66 of the MFP 51 through the interface 1 of the USB 18 (U22).

The IPP client 24 establishes the network session to the proxy 26, upon the user inputting a print instruction (U32). The IPP client 24 transmits, to the proxy 26 through the established session, a print request for causing the print driver 64 to execute print processing (U36). Here, the session is established in the interface 1 of the USB 18 in U22 described above. Furthermore, the USB 18 is the line that is not capable of multisession communication. Thus, the proxy 26 determines that the print request cannot be communicated to the MFP 51 and suspends the transmission of the print request (U40).

Upon receiving the HTTP request (S14: YES), the proxy 66 of the MFP 51 rewrites Host in the HTTP header of the HTTP request (S24). The proxy 66 transmits the HTTP request to the web server 62 (S26). The proxy 66 receives the HTTP response from the web server 62 (S28: YES). The line through which the HTTP request has been received in S22 described above is the USB 18, which is not the line that is capable of multisession communication (S30: NO). Further, in this operation example, the case where "Content-type" in the HTTP header of the HTTP response is not "html" is being described (S31: NO). Thus, the proxy 66 rewrites "Connection" in the HTTP header of the HTTP response to "close" (S40) (see area R4 in FIG. 6). The proxy 66 then transmits the HTTP response to the web browser 23 of the PC 9 through the interface 1 of the USB 18 (S42). In addition, the proxy 66 transmits the data that corresponds to "FIN" in the TCP to the TCP/IP stack 65 and the web server 62 (S44).

The proxy 26 of the PC 9 transmits the received HTTP response to the web browser 23 (U52). The proxy 26 terminates a first session between the web browser 23 and the web server 62 in accordance with the instruction indicating "Connection: close" in the HTTP header of the received HTTP response. In other words, the proxy 26 terminates the session that has been established in U22 (U56).

The proxy 26 determines that the session can be established between the IPP client 24 and the web server 62 and resumes the transmission of the print request, which had been suspended in U40 (U60). Thus, the print request is transferred to the proxy 66 through the interface 1 of the USB 18 (U64). The print request that had been received by the proxy 66 is transferred to the print driver 64. Note that the details of the method for transferring the print request within the MFP 51 are similar to those described above, and thus description thereof will be omitted.

The web browser 23 establishes the network session to the proxy 26 in order to establish a second session to the web server 62 (U62). The web browser 23 transmits, to the proxy 26, the HTTP request that requests for an image constituting the main page to be transmitted through the established session (U66). Here, the session is established in the interface 1 of the USB 18 in U64 described above. Furthermore, the USB 18 is the line that is not capable of multisession communication. Thus, the proxy 26 determines that the HTTP request cannot be communicated to the MFP 51 and suspends the transmission of the HTTP request (U70).

In S62, the proxy 66 transmits the print response to the web browser 23 of the PC 9 through the USB 18. "Connection" in the HTTP header of the print response has been rewritten to "close". The proxy 26 of the PC 9 transmits the received print response to the IPP client 24 (U72). The proxy 26 terminates the session between the IPP client 24 and the web server 62 in accordance with the instruction indicating "Connection: close" in the HTTP header of the received print response (U76).

The proxy 26 determines that the session can be established between the web browser 23 and the web server 62 and resumes the transmission of the HTTP request, which has been suspended in U70 (U80). Thereafter, similar processing is repeated.

<Effects>

Effects of the communication system 1 according to the present embodiment will be described. A case where each of the plurality of client applications (web browser 23 and IPP client 24) communicates with the web server 62 through one endpoint of the USB will be considered. In this case, since the USB is the line that is not capable of multisession communication, while a session is established between the web browser 23, which is one of the client applications, and the web server 62, another session cannot be established between the IPP client 24, which is the other client application, and the web server 62. In particular, if the web browser 23 has established the session to the web server 62 using Keep-Alive, the session between the web browser 23 and the web server 62 is retained until the duration such as Keep Alive Timeout elapses after the entire requests from the web browser 23 to the web server 62 complete. If that is the case, a period for which the IPP client 24 cannot establish the session to the web server 62 is further extended, and thus a period for which the printing is not executed is extended. Thus, convenience for the user may be lost.

The proxy 66 of the MFP 51 according to the present embodiment can rewrite "Connection" in the HTTP header of the HTTP response to "close" (S40) if the communication line is the line that is not capable of multisession communication (S30: NO). With this configuration, the proxy 66 can transmit, to the PC 9, the instruction to execute the processing for disconnecting the session after the HTTP response is transmitted to the client application. Thus, as described in the operation example with reference to FIGS. 7 to 9, the session can be disconnected in response to the completion of the processing in which the session is established and the proxy 66 receives one HTTP request (S14: YES) and in which the proxy 66 transmits one HTTP response (S42) (U56). In other words, the session can be established and then be disconnected per processing in which the HTTP response is returned for the corresponding HTTP request. With this configuration, even in the case where a request is made by the IPP client 24 to the web server 62 while a plurality of requests is being made by the web browser 23 to the web server 62, when one request from the web browser 23 to the web server 62 completes (U52), the session between the web browser 23 and the web server 62 can be disconnected (U56), and the session between the IPP client 24 and the web server 62 can be established (U64). Thus, the request from the IPP client 24 to the web server 62 can interrupt while the plurality of requests is transmitted from the web browser 23 to the web server 62. Accordingly, a situation where a period in which printing is not executed is extended as a result of a period in which the IPP client 24 cannot establish the session to the web server 62 (see time T1 in FIGS. 7 to 9) being extended can be prevented.

The instruction for executing the processing for disconnecting the session can be transmitted to the PC 9 by using a message with content to close the connection, which is specified in the HTTP header included in the HTTP response. Thus, a dedicated configuration for transmitting the instruction for executing the processing for disconnecting the session does not need to be provided. Consequently, the instruction for executing the processing for disconnecting the session can be transmitted based on the HTTP, which can eliminate machine dependence of the PCs, and thus the disconnect instruction can reliably be conducted to the PC.

If the content of the HTTP request is the content to cause the web page to be written (S31: YES), a plurality of files such as text files and image files may need to be communicated using the session. With the proxy 66 of the MFP 51 according to the present embodiment, if the content of the HTTP request is the content to cause the web page to be written (S31: YES), "Connection" in the HTTP header of the HTTP response is not rewritten to "close", and thus the instruction for executing the processing for disconnecting the session is not transmitted to the PC 9. Accordingly, if "Connection" in the HTTP header of the HTTP response is "Keep-Alive", the state in which the session between the client application and the web server 62 is established can be retained. Then, the plurality of files can be communicated by using the session that is kept being established. With this configuration, compared to the case where the session is established and disconnected on a file-by-file basis, the time it takes for communication can be reduced, and a load on the CPU can be reduced.

If the HTTP request is not received for a predetermined period of time (S16: YES), the proxy 66 can transmit the disconnect instruction information to the PC 9 (S18). Thus, even in the case where "Connection" in the HTTP header of the HTTP response is not rewritten to "close" (S30: YES, or S31: YES), the session can be disconnected if communication using the session is not being carried out.

While specific embodiments of the present invention have been described in detail above, such description is for illustrative purposes only and is not intended to limit the scope and claims of the invention. Techniques described in the claims of the invention include various modifications and changes made to the specific examples illustrated above. Modifications according to the above embodiments are listed below.

<Modifications>

The embodiment is not limited to a mode where the proxy 66 carries out the processing for rewriting "Connection" in the HTTP header of the HTTP response to "close" in S40. This processing may be carried out by the web server 62. In such a case, the web server 62 may transmit the data that corresponds to "FIN" in the TCP to the TCP/IP stack 65 and the proxy 66.

An applicable scope of the technique described in the present specification is not limited to the case where the communication for configuring settings for the MFP 51 and the communication for transmitting the print data to the MFP 51 are executed using an identical endpoint of the interface 1. For example, the technique described in the present specification can be applied to the case where the communication for configuring settings for the MFP 51 and the communication for executing various types of processes by the MFP 51 are executed using the identical endpoint. For example, the technique described in the present specification can also be applied to the case where a first instance of the web browser 23 is executed in the PC 9 to configure print settings for the MFP 51 and a second instance of the web browser 23 is executed in the PC 9 to early out a FAX transmission using the Internet or email transmission/reception using the Internet.

Although the USB 18 has been described as an example of the communication line that is not capable of multisession communication in the embodiment described above, the embodiment is not limited to this mode. RS-232C that carries out serial communication may, for example, be used as the communication line that is not capable of multisession communication.

In the operation example illustrated in FIGS. 7 to 9, an order of a timing at which the transmission of the print request resumes (U60) and a timing at which the second session is established to the web browser 23 (U62) may be interchangeable.

Although the MFP 51 has been described as an example the communication device in which the web server 62 is provided, the embodiment is not limited to this mode. The communication device may be any type of device as long as the device is capable of a USB connection, and may be, for example, a PC or a cellphone.

Although the web browser 23 and the IPP client 24 have been described as examples of the client application that carries out multisession communication in the embodiment described above, the embodiment is not limited to these applications. Any other types of applications that carry out multisession communication may be employed.

Although the mode in which the HTTP header of the HTTP request is rewritten in S24 has been described, the embodiment is not limited to this mode. The mode in which the HTTP request is transferred without rewriting the HTTP header may instead be employed.

At least one of S30 and S31 may be omitted. In the ease where both S30 and S31 are to be emitted, control can be carried out such that when the HTTP response is received from the web server 62 (S28: YES), "Connection" in the HTTP header is always rewritten to "close" (S40).

The invention claimed is:

1. A communication device comprising:
a network interface for communicating with a data processing device via a communication line, the data processing device including one or more client applications that execute communications by using multisession communication;
a processor coupled to the network interface; and
a memory storing computer-readable instructions that, when executed by the processor, cause the communication device to perform:
establishing a session with a specific client application among the one or more client applications via the communication line;
receiving an HTTP request from the specific client application via the established session; and
transmitting an HTTP response to the specific client application via the established session,
the HTTP response being a response to the HTTP request received in the receiving,
the HTTP response including an HTTP header containing first information,
the first information being information for causing the data processing device to retain the established session even after transmitting of the HTTP response ends and to use the retained session in a second request and subsequent requests, and
the first information being information corresponding to Keep-Alive in accordance with an HTTP standard,
wherein the transmitting the HTTP response includes:
rewriting the first information in a case where the communication line used to receive the HTTP request is a Universal Serial Bus (USB),
the rewritten first information being information for causing the data processing device to disconnect the established session after transmitting the HTTP response to the specific client application via the established session,
the rewritten first information being information corresponding to Close in accordance with the HTTP standard; and
not rewriting the first information in a case where the communication line used to receive the HTTP request is a line that is not the Universal Serial Bus and is capable of the multisession communication.

2. The communication device according to claim 1, wherein
the network interface includes a USB interface, and
the computer-readable instructions further cause the communication device to perform:
determining that the communication line used to receive the HTTP request is the Universal Serial Bus when the HTTP request is received via the USB interface.

3. The communication device according to claim 2, wherein
the computer-readable instructions further cause the communication device to perform:
rewriting content of a message to close a connection in the case where the communication line used to receive the HTTP request is a line that is not capable of the multisession communication, and
the message is a message specified in the HTTP header of the HTTP response and relating to the connection.

4. The communication device according to claim 1, wherein
the transmitting the HTTP response includes transmitting the HTTP response to the specific client application without transmitting the rewritten first information to the data processing device, in a case where a content type included in the HTTP header included in the HTTP response indicates HTML and the HTTP response is a response with content to write a web page.

5. The communication device according to claim 1, wherein
the transmitting the HTTP response includes transmitting second information to the data processing device in a case where the session established with the specific client application is retained and the HTTP request is not received for a predetermined period of time, and
the second information is information for causing the data processing device to disconnect the established session.

6. The communication device according to claim 1, wherein
the network interface includes a Bluetooth interface, and
the computer-readable instructions further cause the communication device to perform:
determining that the communication line used to receive the HTTP request is capable of the multisession communication when the HTTP request is received via the Bluetooth interface.

7. The communication device according to claim 1, wherein
the computer-readable instructions comprise a web server and a proxy,
the specific client application is a web browser,
the receiving includes creating a socket between the proxy and the web server,
the transmitting the HTTP response includes transmitting the rewritten first information to the data processing device and eliminating the created socket,
the computer-readable instructions further cause the communication device to perform:
determining whether or not the HTTP request has been received during a Keep-Alive duration, the Keep-Alive duration being started from when the socket was created in the creating; and
eliminating the created socket without transmitting the rewritten first information to the data processing device, when it is determined that the HTTP request is not received during the Keep-Alive duration in the determining.

8. The communication device according to claim 1, wherein
the receiving the HTTP request includes receiving the HTTP request from each of the one or more client applications via one endpoint among a plurality of endpoints included in the USB.

9. A non-transitory computer-readable storage medium storing computer-readable instructions for a communication device,
the communication device comprising:
a network interface for communicating with a data processing device via a communication line, the data processing device including one or more client applications that execute communications by using multisession communication;
a processor coupled to the network interface; and
a memory,
wherein the computer-readable instructions, when executed by the processor, cause the communication device to perform:
establishing a session with a specific client application among the one or more client applications via the communication line;
receiving an HTTP request from the specific client application via the established session; and
transmitting an HTTP response to the specific client application via the established session,
the HTTP response being a response to the HTTP request received in the receiving,
the HTTP response including an HTTP header containing first information,
the first information being information for causing the data processing device to retain the established session even after transmitting of the HTTP response ends and to use the retained session in a second request and subsequent requests, and
the first information being information corresponding to Keep-Alive in accordance with an HTTP standard,
wherein the transmitting the HTTP response includes:
rewriting the first information in a case where the communication line used to receive the HTTP request is a Universal Serial Bus (USB),
the rewritten first information being information for causing the data processing device to disconnect the established session after transmitting the HTTP response to the specific client application via the established session,
the rewritten first information being information corresponding to Close in accordance with the HTTP standard; and
not rewriting the first information in a case where the communication line used to receive the HTTP request is a line that is not the Universal Serial Bus and is capable of the multisession communication.

10. The non-transitory computer-readable storage medium according to claim 9, wherein
the network interface includes a USB interface, and
the computer-readable instructions further cause the communication device to perform:
determining that the communication line used to receive the HTTP request is the Universal Serial Bus when the HTTP request is received via the USB interface.

11. The non-transitory computer-readable storage medium according to claim 10, wherein
the computer-readable instructions further cause the communication device to perform:
rewriting content of a message to close a connection in the case where the communication line used to receive the HTTP request is a line that is not capable of the multisession communication, and
the message is a message specified in the HTTP header of the HTTP response and relating to the connection.

12. The non-transitory computer-readable storage medium according to claim 9, wherein
the transmitting the HTTP response includes transmitting the HTTP response to the specific client application without transmitting the rewritten first information to the data processing device, in a case where a content type included in the HTTP header included in the HTTP response indicates HTML and the HTTP response is a response with content to write a web page.

13. The non-transitory computer-readable storage medium according to claim 9, wherein
the transmitting the HTTP response includes transmitting second information to the data processing device in a case where the session established with the specific client application is retained and the HTTP request is not received for a predetermined period of time, and
the second information is information for causing the data processing device to disconnect the established session.

14. The non-transitory computer-readable storage medium according to claim 9, wherein
the network interface includes a Bluetooth interface, and
the computer-readable instructions further cause the communication device to perform:
determining that the communication line used to receive the HTTP request is capable of the multisession communication when the HTTP request is received via the Bluetooth interface.

15. The non-transitory computer-readable storage medium according to claim 9, wherein the computer-readable instructions comprise a web server and a proxy, the specific client application is a web browser, the receiving includes creating a socket between the proxy and the web server, the transmitting the HTTP response includes transmitting the rewritten first information to the data processing device and eliminating the created socket, the computer-readable instructions further cause the communication device to perform:

determining whether or not the HTTP request has been received during a Keep-Alive duration, the Keep-Alive duration being started from when the socket was created in the creating; and eliminating the created socket without transmitting the rewritten first information to the data processing device, when it is determined that the HTTP request is not received during the Keep-Alive duration in the determining.

16. The non-transitory computer-readable storage medium according to claim 9, wherein the receiving the HTTP request includes receiving the HTTP request from each of the one or more client applications via one endpoint among a plurality of endpoints included in the USB.

\* \* \* \* \*